(12) United States Patent
Beck et al.

(10) Patent No.: US 7,650,734 B2
(45) Date of Patent: Jan. 26, 2010

(54) AUTOMATIC MASS-FLOW SENSOR CALIBRATION FOR A YIELD MONITOR

(75) Inventors: Andy D. Beck, Urbandale, IA (US); Terrence D. Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 80 days.

(21) Appl. No.: 11/278,068

(22) Filed: Mar. 30, 2006

(65) Prior Publication Data
US 2006/0179955 A1    Aug. 17, 2006

Related U.S. Application Data

(62) Division of application No. 10/909,241, filed on Jul. 30, 2004, now Pat. No. 7,073,314, which is a division of application No. 10/246,217, filed on Sep. 18, 2002, now Pat. No. 6,820,459.

(51) Int. Cl.
*A01D 41/127*    (2006.01)

(52) U.S. Cl. .................. 56/10.2 R; 73/1.33; 73/1.34; 702/101

(58) Field of Classification Search ............. 56/10.2 R, 56/10.2 D, DIG. 7, DIG. 15; 460/119; 73/1.33, 73/1.34; 702/101–102, 104
See application file for complete search history.

(56) References Cited

U.S. PATENT DOCUMENTS

| | | | |
|---|---|---|---|
| 4,168,466 A | 9/1979 | Boldt | |
| 4,584,522 A | 4/1986 | Varela | |
| 5,121,638 A | 6/1992 | Gmur | |
| 5,282,389 A | 2/1994 | Favre et al. | |
| 5,327,708 A | 7/1994 | Gerrish | |
| 5,343,761 A | 9/1994 | Myers | |
| 5,369,603 A | 11/1994 | Myers | |
| 5,480,354 A | 1/1996 | Sadjadi | |
| 5,561,250 A | 10/1996 | Myers | |
| 5,689,809 A * | 11/1997 | Grube et al. | ................. 455/457 |
| 5,708,366 A | 1/1998 | Nelson | |
| 5,750,877 A | 5/1998 | Behnke et al. | |
| 5,790,420 A | 8/1998 | Lang | |
| 5,795,221 A | 8/1998 | Diekans | |
| 5,837,906 A | 11/1998 | Palmer | |
| 5,845,213 A * | 12/1998 | Sumner et al. | ............... 455/458 |
| 5,957,773 A | 9/1999 | Olmsted et al. | |
| 5,970,802 A | 10/1999 | Strubbe | |
| 5,995,895 A | 11/1999 | Watt et al. | |
| 6,024,655 A * | 2/2000 | Coffee | ......................... 473/407 |
| 6,089,079 A | 7/2000 | Rosenblum et al. | |
| 6,100,526 A | 8/2000 | Mayes | |

(Continued)

FOREIGN PATENT DOCUMENTS

EP    0 276 106 A2    7/1988

(Continued)

*Primary Examiner*—Thomas B Will
*Assistant Examiner*—Mai T Nguyen

(57) ABSTRACT

A system and method is provided for remotely and automatically calibrating a mass-flow sensor in a yield monitor of a combine. The invention uses a wireless communication device installed on a combine and a remote wireless communication device installed on a grain carrier or truck carrier. Once an actual weight is obtained, calibration information is sent to the combine to calibrate the mass-flow sensor.

12 Claims, 11 Drawing Sheets

U.S. PATENT DOCUMENTS

| | | | |
|---|---|---|---|
| 6,119,531 | A | 9/2000 | Wenote et al. |
| 6,141,614 | A * | 10/2000 | Janzen et al. ................ 701/50 |
| 6,185,990 | B1 | 2/2001 | Missotten et al. |
| 6,272,819 | B1 | 8/2001 | Wendt et al. |
| 6,272,935 | B1 | 8/2001 | Strubbe |
| 6,282,476 | B1 | 8/2001 | Heronymus et al. |
| 6,285,938 | B1 | 9/2001 | Lang et al. |
| 6,360,179 | B1 | 3/2002 | Reep |
| 6,460,008 | B1 | 10/2002 | Hardt |
| 6,492,941 | B1 * | 12/2002 | Beason et al. ............ 342/357.1 |
| 6,508,049 | B1 | 1/2003 | Cox et al. |
| 6,525,276 | B1 | 2/2003 | Vellous et al. |
| 6,591,145 | B1 | 7/2003 | Hoskinson et al. |
| 6,687,616 | B1 | 2/2004 | Peterson et al. |
| 6,739,078 | B2 | 5/2004 | Morley et al. |
| 6,987,975 | B1 * | 1/2006 | Irvin et al. ................ 455/456.1 |
| 2001/0050339 | A1 | 12/2001 | Panigraphi et al. |
| 2002/0014116 | A1 | 2/2002 | Campbell et al. |
| 2004/0002368 | A1 | 1/2004 | Shinners et al. |
| 2004/0015477 | A1 | 1/2004 | Beck et al. |
| 2004/0194442 | A1 | 10/2004 | Mjaertens |

FOREIGN PATENT DOCUMENTS

| | | |
|---|---|---|
| JP | 11076843 A2 | 3/1999 |
| JP | 11225559 A2 | 8/1999 |

\* cited by examiner

AUTOMATIC MASS-FLOW SENSOR CALIBRATION FOR A YIELD MONITOR

This application is a division of U.S. application Ser. No. 10/909,241 filed Jul. 30, 2004 now U.S. Pat. No. 7,073,314; which is a division of U.S. application Ser. No. 10/246,217 filed Sep. 18, 2002, now U.S. Pat. No. 6,820,459.

FIELD OF THE INVENTION

This invention relates to the field of yield monitoring. In particular, this invention is drawn to an automated wireless calibration technique.

BACKGROUND OF THE INVENTION

Combines commonly include yield monitors to determine desired properties of agricultural products as they are harvested. A typical yield monitor includes sensors, such as a mass-flow sensor and a moisture sensor. To obtain an accurate measurement of yield, the mass-flow sensor and moisture sensor must be periodically calibrated. The procedure for calibrating a mass-flow sensor normally involves harvesting grain, filling a grain cart, truck, or semi trailer, and comparing the measured weight with a more accurate weight obtained from a grain cart with a weighing system or from a certified truck scale.

One problem with prior art calibration techniques is that when a truck or trailer travels to a remote scale, a significant amount of time may elapse between the start of the calibration procedure and the end. In addition, a farmer may hesitate to stop harvesting while waiting to receive the actual weights from the calibration load. During the time that the trucks are away from the field, the calibration factor for the mass-flow sensor could be off significantly. Grain carts that are equipped with a weighing system can be used to more easily and quickly manually calibrate a mass-flow sensor. However, many grain carts are not equipped with a weighing system because they do not add significant value to the system.

In either case, the actual calibration load weight requires a manual entry into a display device (such as a GreenStar Display device). The manual entry of calibration information takes time for the operator. In addition, if the operator does not calibrate frequently, the accuracy of the mass-flow sensor can decrease since the load is based on a larger average and not the latest field conditions. Typically, it is considered too time-consuming to manually update the calibration factor after every load.

SUMMARY OF THE INVENTION

A method of the invention is provided for calibrating a mass-flow sensor on a yield monitor of a combine, comprising the steps of: harvesting grain using the combine; transferring the harvested grain to a location where its actual weight can be determined; providing a wireless communication device on the combine; transmitting information relating to the actual weight of the harvested grain to the wireless communication device on the combine; and calibrating the mass-flow sensor using the information.

Another embodiment of the invention provides a system for calibrating a mass-flow sensor on a yield monitor of a combine, comprising the steps of: a first wireless transceiver operatively connected to the yield monitor; and a second wireless transceiver operatively connected to a grain carrier for transmitting calibration information to the first wireless transceiver.

Another embodiment of the invention provides a method of remotely calibrating a sensor on a combine, comprising the steps of: providing a wireless communication device on the combine; providing a remote wireless communication device; after harvesting an agricultural product, removing the harvested agricultural product from the combine; determining certain properties of the harvested agricultural product; transmitting information from the remote wireless communication device to the wireless communication device on the combine; and using the information to calibrate the sensor.

BRIEF DESCRIPTION OF THE DRAWINGS

The present invention is illustrated by way of example and not limitation in the figures of the accompanying drawings, in which like references indicate similar elements and in which:

FIG. 7 is a flowchart for establishing a wireless connection in regard to the combine.

Specifically, FIG. 8 is a block diagram showing the wireless startup procedure for the combine.

FIG. 9 is a flowchart showing the procedure for maintaining connection.

FIG. 10 is a flowchart showing the unloading auger status change for the combine.

FIG. 11 is a flowchart showing the procedure for weighing the last load on the combine.

DESCRIPTION OF THE INVENTION

The present invention provides a system and method for remotely and automatically calibrating sensors, such as the mass-flow sensor, in a yield monitor of a combine. The invention uses a wireless communication device installed on a combine and a remote wireless communication device. The remote wireless communication device can be installed on a grain cart having an electronic weighing system, on a truck or semi trailer, or installed on any other device having access to desired information.

While harvesting, the yield monitor takes information from the mass-flow sensor and generates an estimation of the weight of the harvested product. Once the actual weight of the harvested product is known (either from the grain cart weighing system, or from a truck scale, etc.), calibration information relating to a particular load can be transmitted to the combine, where it can be used to re-calibrate the mass-flow sensor. The calibration information may be comprised of a calibration factor related to the actual and estimated weights. Alternatively, the calibration information may simply be comprised of information relating to the actual weight. In that case, a calibration factor is calculated on the combine. The new calibration factor, based on the transmitted information, can be applied to previously harvested load grain to scale the yield and to get a more accurate representation of the yield throughout the field during all harvest conditions.

In the case where the remote wireless communication device is installed on a truck or semi trailer, the actual weight information can be stored and transmitted to the combine later (e.g., when the truck or trailer is in closer proximity to the combine).

The automatic calibration procedure of the present invention facilitates continual calibration updates on a load by load basis, which results in a reduction of yield monitoring errors. In addition, the measured yield of harvested loads are more accurate because they represent current harvest conditions, as opposed to an average condition when the last calibration was performed.

Figure 1:
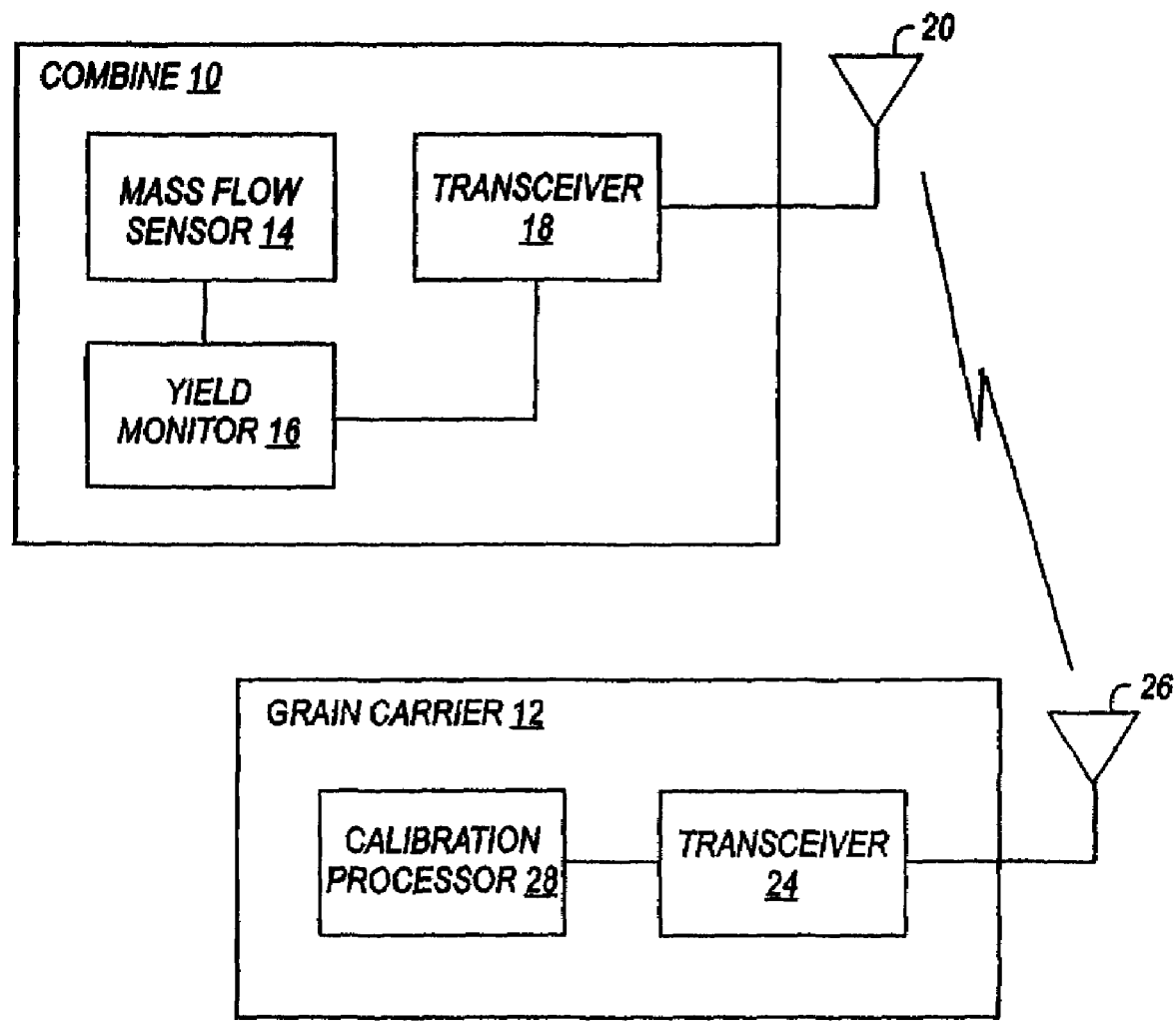
FIG. 1 is a block diagram of a combine and a grain carrier using the present invention.

Following is a description of one example of an implementation of the present invention. FIG. 1 is a block diagram of a combine 10 and a grain carrier 12. The grain carrier 12 may be comprised of a grain cart, truck, semi trailer, or any other suitable grain carrying device. The combine 10 includes a mass-flow sensor 14 which is connected to a yield monitor 16. As described above, the yield monitor 16 is capable of providing an estimated weight of the harvested grain based on information from the mass-flow sensor 14. Note that various other sensors and components are not shown for purposes of clarity. The yield monitor 16 is connected to a wireless communication device transceiver 18, which is connected to an antenna 20.

The grain carrier 12 has a wireless transceiver 24, which is connected to an antenna 26. The wireless transceiver 24 is connected to a calibration processor 28 which generates calibration information based on the actual weight of grain in the grain carrier 12. The combine wireless transceiver 18 is capable of exchanging information with the grain carrier wireless communication device transceiver 24.

When the combine 10 harvests a load of grain, the yield monitor 16 estimates the weight of the load of grain based on information from the mass-flow sensor 14. After harvested grain is transferred to the grain carrier 12, the grain is weighed, either by a truck scale or on the grain carrier 12 if the grain carrier has load weighing capabilities. The actual weight of the grain is used by the calibration processor 28 to generate calibration information which is transmitted back to the combine 10 for use by the yield monitor 16 to calibrate the mass-flow sensor 14. The calibration information may include a calibration factor relating to the actual weight, an old calibration factor, and the weight estimated by the yield monitor. Alternately, the calibration information may just include the actual weight.

FIGS. 2-5 are a detailed flow charts illustrating one example of the operation of the present invention. Generally, in FIGS. 2-5, processes performed on the combine are shown to the left, and processes performed in the grain carrier are shown to the right. The processes performed at the combine and at the grain carrier are executed in parallel. Please note that various functions can take place at either the combine or the grain carrier. FIGS. 2-5 simply show one example of the invention.

Figure 2:
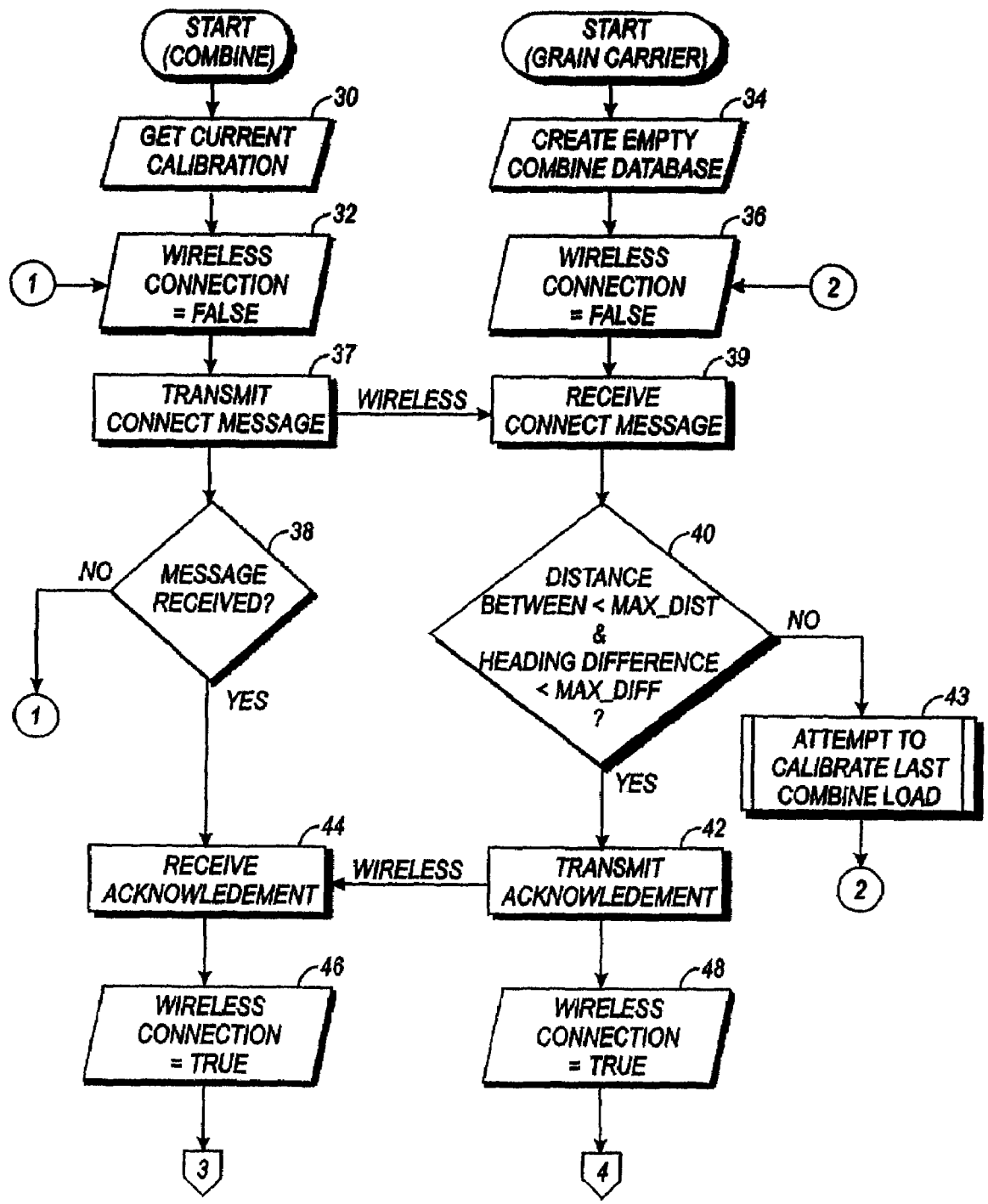
FIG. 2 is a flowchart illustrating a procedure for establishing a wireless connection between a combine and a grain carrier.

FIG. 2 is a flowchart illustrating the establishment of a wireless connection between a combine and a grain carrier. At the combine, the process starts with step 30 where the process retrieves the current calibration factor. In addition, a wireless connection variable is set to FALSE at step 32. At the grain carrier, the process starts with step 34 where an empty combine database is created. Note that the combine database may include information for one, or multiple combines. In addition, a wireless connection variable is set to FALSE at step 36. At step 37, the wireless transceiver of the combine transmits a CONNECT message. If, at step 38, it is determined that no message has been received from the grain carrier, the process loops back to step 32. This loop will continue until a reply message is received from the grain carrier.

At step 39, the grain carrier receives the CONNECT message from the wireless transceiver of the combine and the process proceeds to step 40. At step 40, the process asks whether the distance between the grain carrier and combine is less than a maximum desired distance (variable MAX_DIST) and whether the heading difference is less than a maximum desired difference (variable MAX_DIFF). If so, the process proceeds to step 42 where an acknowledgement signal is transmitted, and received (at step 44) by the combine. If not, then the process proceeds to step 43, where an attempt is made to calibrate the last combine load (see FIG. 6). At this point, a wireless connection has been established between the combine in the grain carrier. At both the combine and grain carrier, a wireless connection variable is set to TRUE (steps 46 and 48).

Figure 3:
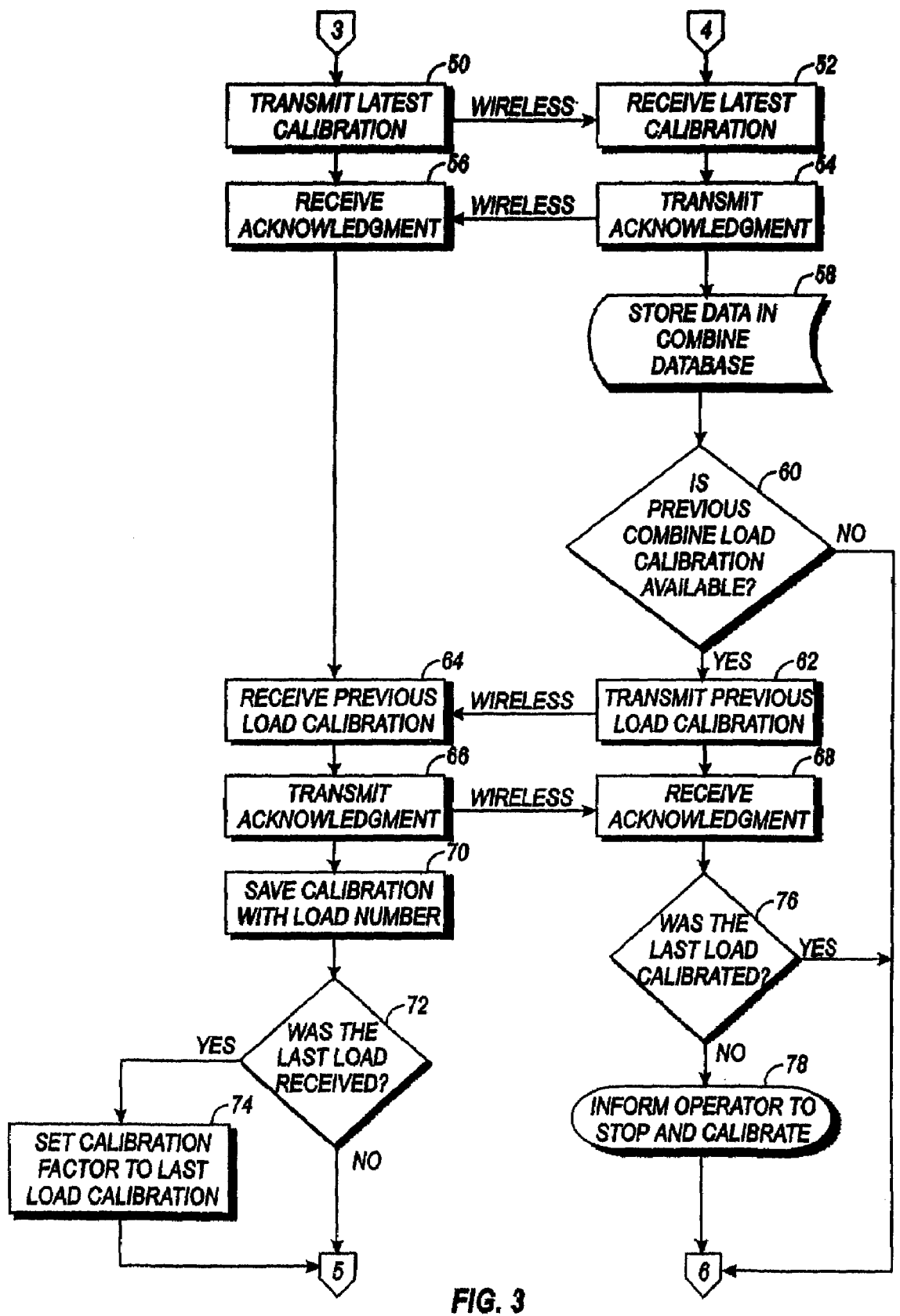
FIG. 3 is a flowchart illustrating a wireless connection start-up procedure.

Once a wireless connection is established, a wireless connection start-up procedure is started. FIG. 3 is a flow chart of the wireless connection start-up procedure. At step 50, the combine transmits its latest calibration factor. At step 52, the grain carrier receives the calibration factor from the combine. At step 54, the grain carrier transmits an acknowledgement signal, which is received by the combine at step 56. After transmitting the acknowledgement, the received information is stored in the combine database at step 58. Next, at step 60, the process asks whether the previous combine load calibration information is available. If not, the process proceeds to step 82, described below. If previous combine load calibration information is available, the process proceeds to step 62 where the previous load calibration factor is transmitted to the combine. At step 64, the combine receives the previous load calibration factor. In response, the combine transmits an acknowledgement signal at step 66. The grain carrier receives the acknowledgement at step 68. At the combine, the process proceeds to step 70 where the received calibration factor is saved and associated with a load number. Next, at step 72, the process asks whether the last load calibration factor was received. If so, the process proceeds to step 74 where the calibration factor is set to the last load calibration factor. At the grain carrier, the process proceeds to step 76 where the process asks whether the last load was calibrated. If so, the process proceeds to step 82. If not, the process proceeds to step 78 where the system informs the operator to stop and perform a calibration.

Figure 4:
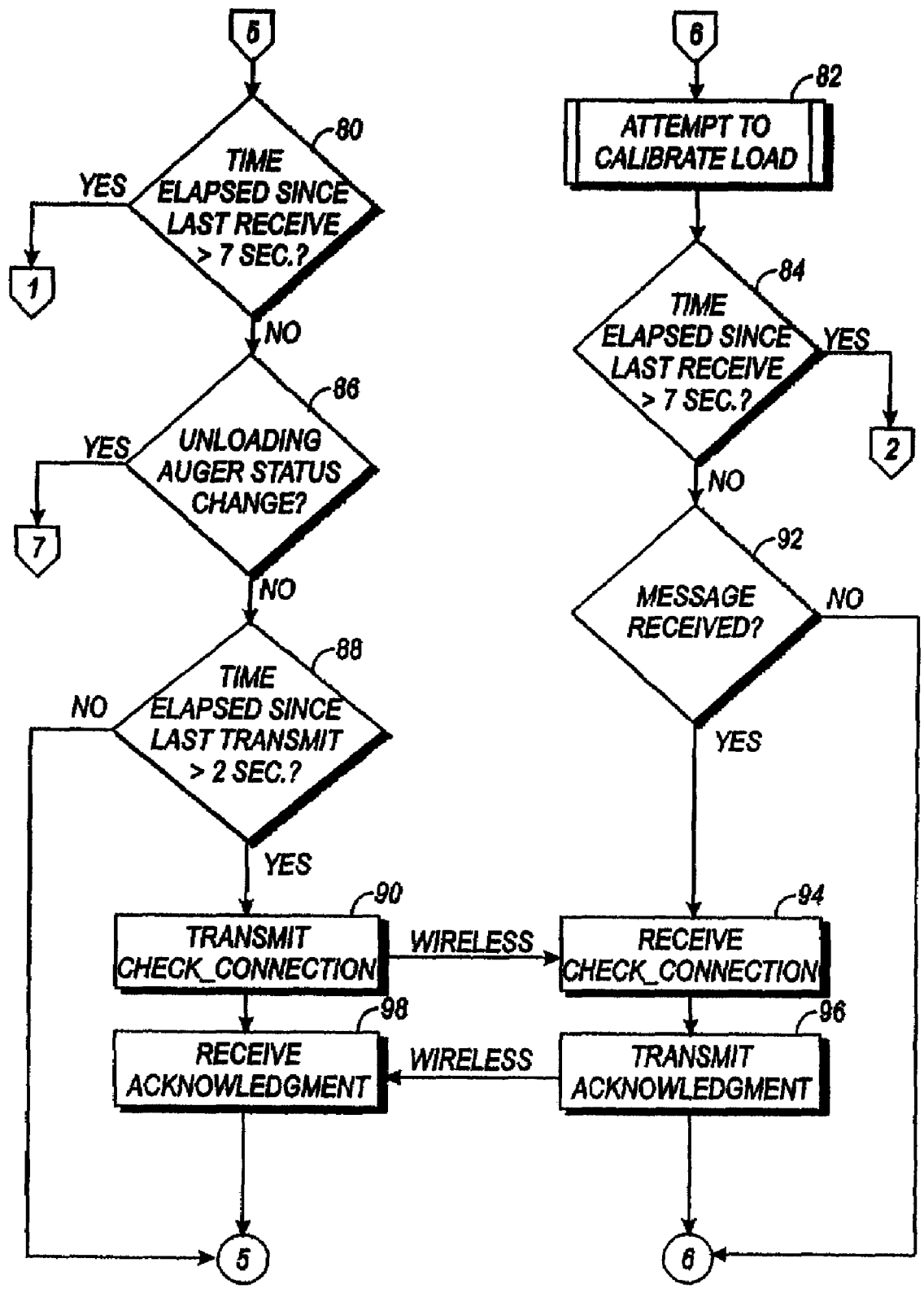
FIG. 4 is a flowchart illustrating a procedure for maintaining a wireless connection.

After the wireless connection start-up procedure described above has been completed, a process begins which maintains the connection. FIG. 4 is a flowchart of a procedure to maintain the connection. At step 80 of FIG. 4, the process asks whether the time elapsed since the last received signal is greater than a threshold value (e.g., 7 seconds). If so, it is determined that the connection has been lost and the process goes back to step 32 of FIG. 2. At step 82, the grain carrier attempts to calibrate the load. The process of calibrating a load is described below and illustrated in FIG. 6. Next, at step 84 the process asks whether the time elapsed since the last received signal is greater than a threshold value (e.g., 7 seconds). If so, it is determined that the connection has been lost and the process goes back to step 36 of FIG. 2. If a connection is maintained, the process at the combine goes through a loop until the connection is lost or the status of the unloading auger has changed. At step 86, the process asks whether the unloading auger status has changed. If so, the process proceeds to step 100 in FIG. 5. If not, the process asks at step 88 whether the time elapsed since the last transmission is greater than a threshold value (e.g., 2 seconds). If not, the process proceeds back to step 80. If so, the process proceeds to step 90 and a CHECK_CONNECTION signal is transmitted. At the grain carrier, the process proceeds to step 92 and asks whether a message has been received. If not, the process goes back to step 82. If the CHECK_CONNECTION is received at step 94, an acknowledgment is transmitted at step 96 and received by the combine at step 98. The process at the grain carrier then proceeds back to step 82.

Figure 5:
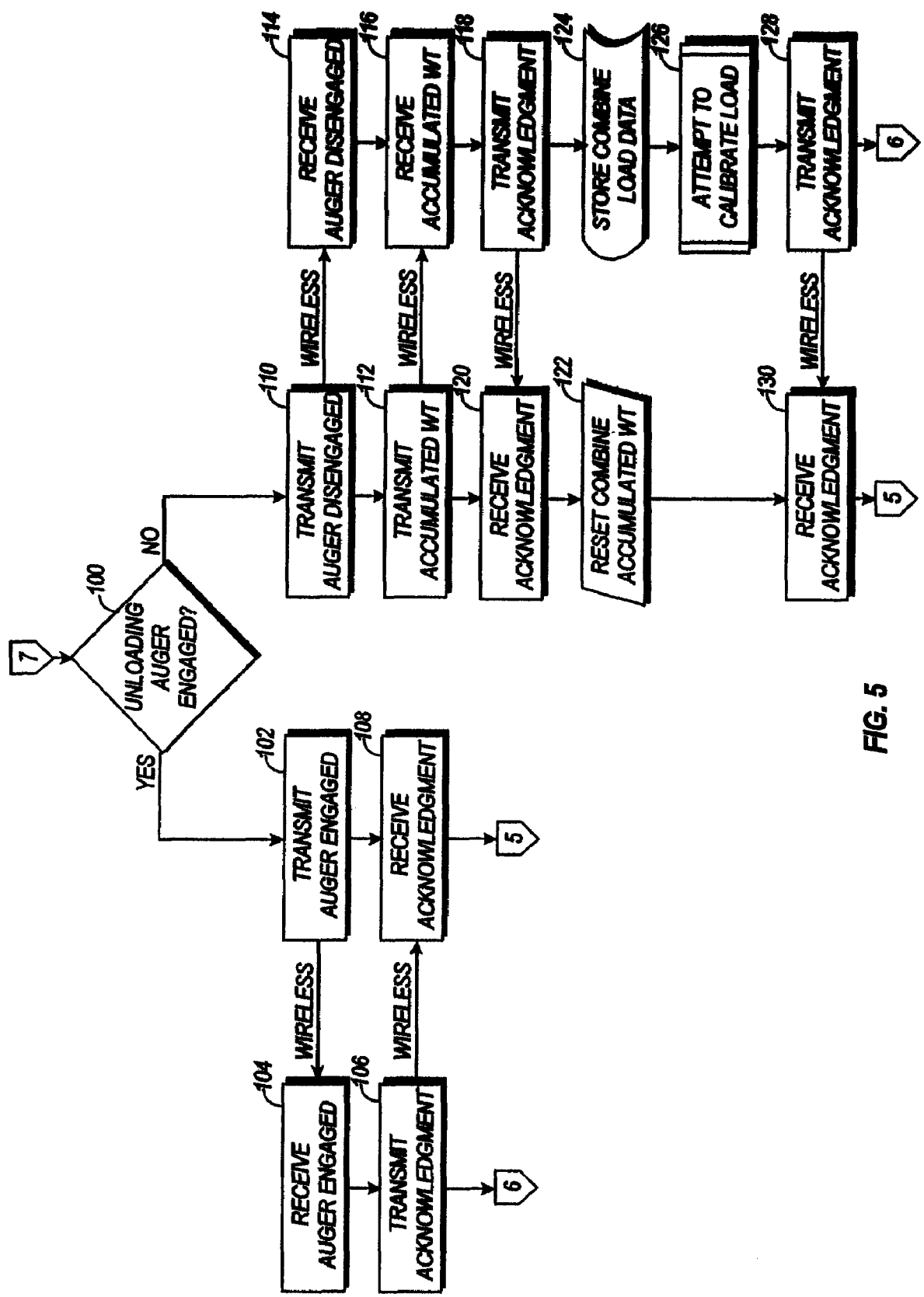
FIG. 5 is a flowchart of a combine unloading auger status change procedure.

FIG. 5 is a flowchart of the combine unloading auger status change procedure. If, back at step 86, it was determined that the status of the unloading auger changed, the process illustrated in FIG. 5 is performed. The process illustrated in FIG. 5 begins with step 100 where the process asks whether the unloading auger is engaged. If the unloading auger is engaged (i.e., the combine has just begun unloading grain), the process proceeds to step 102 where the combine transmits an auger engaged signal. At step 104, the grain carrier receives the auger engaged signal and transmits an acknowledgement signal (step 106). At step 108, the combine receives the acknowledgement signal and the process proceeds back to steps 80 and 82 shown in FIG. 4. If, at step 100, the auger is not engaged (i.e., the combine has just finished unloading grain) the process proceeds to step 110 where the combine transmits an auger disengaged signal. In addition, at step 112, the combine transmits an accumulated weight signal, relating to the estimated weight generated by the yield monitor. At steps 114 and 116, the grain carrier receives the auger disengaged signal and the accumulated weight signal. At step 118, the grain carrier transmits an acknowledgement signal which is received by the combine at step 120. At the combine, the process proceeds to step 122 where the combine accumulated weight variable is reset. At the grain carrier, the process proceeds to step 124 where the combine load data is stored. Next, at step 126, an attempt is made to calibrate the load (see FIG. 6). At step 128 the grain carrier transmits an acknowledgement signal, which is received by the combine at step 130. Next, the process proceeds back to steps 80 and 82 of FIG. 4.

Figure 6:
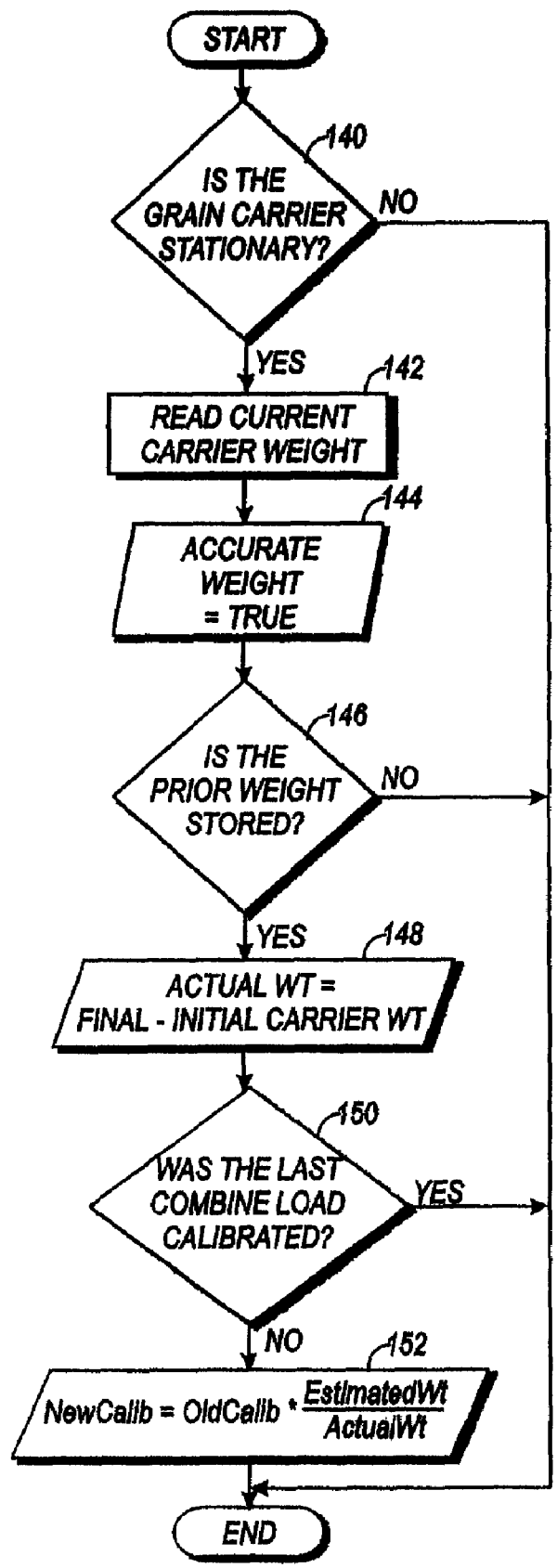
FIG. 6 is a flowchart illustrating the process of calibrating a load.

FIG. 6 is a flowchart illustrating the process of attempting to calibrate the last load. Note that this process may be executed before or after a wireless connection is established. The process begins at step 140 where the process asks whether the grain carrier is stationary. If not, the process ends. If the grain carrier is stationary, the process proceeds to step 142 where the current cart weight is read. In the case of a grain cart having weighing capabilities, the grain cart weighing system can provide the weight. In the case of a grain carrier being weighed on a truck scale, the weight is provided by the scale. Next, at step 144, the accurate weight variable is set to TRUE. At step 146, the process asks whether a prior weight is stored. If not, the process ends. If a prior weight is stored, the process proceeds to step 148 where the actual weight variable is set equal to the final weight minus the initial weight (i.e., the actual weight of the grain is calculated since the measured weights include the weight of the grain carrier). At step 150, the process asks whether the last combine load was calibrated. If so, the process ends. If the last combine load was not calibrated, the process proceeds to step 152 where a new calibration factor is calculated. The new calibration factor is set equal to the old calibration factor times the ratio of the estimated weight from the combine to the actual weight calculated above. After step 152, the process ends.

In the description below, the invention will be described in the context of a combine grain harvester, although it to is understood that the invention may be used with any type of agricultural product.

FIGS. 7-11 are flow charts illustrating an example of the operation of the present invention relating primarily to the calibration of a combine.

Figure 7:
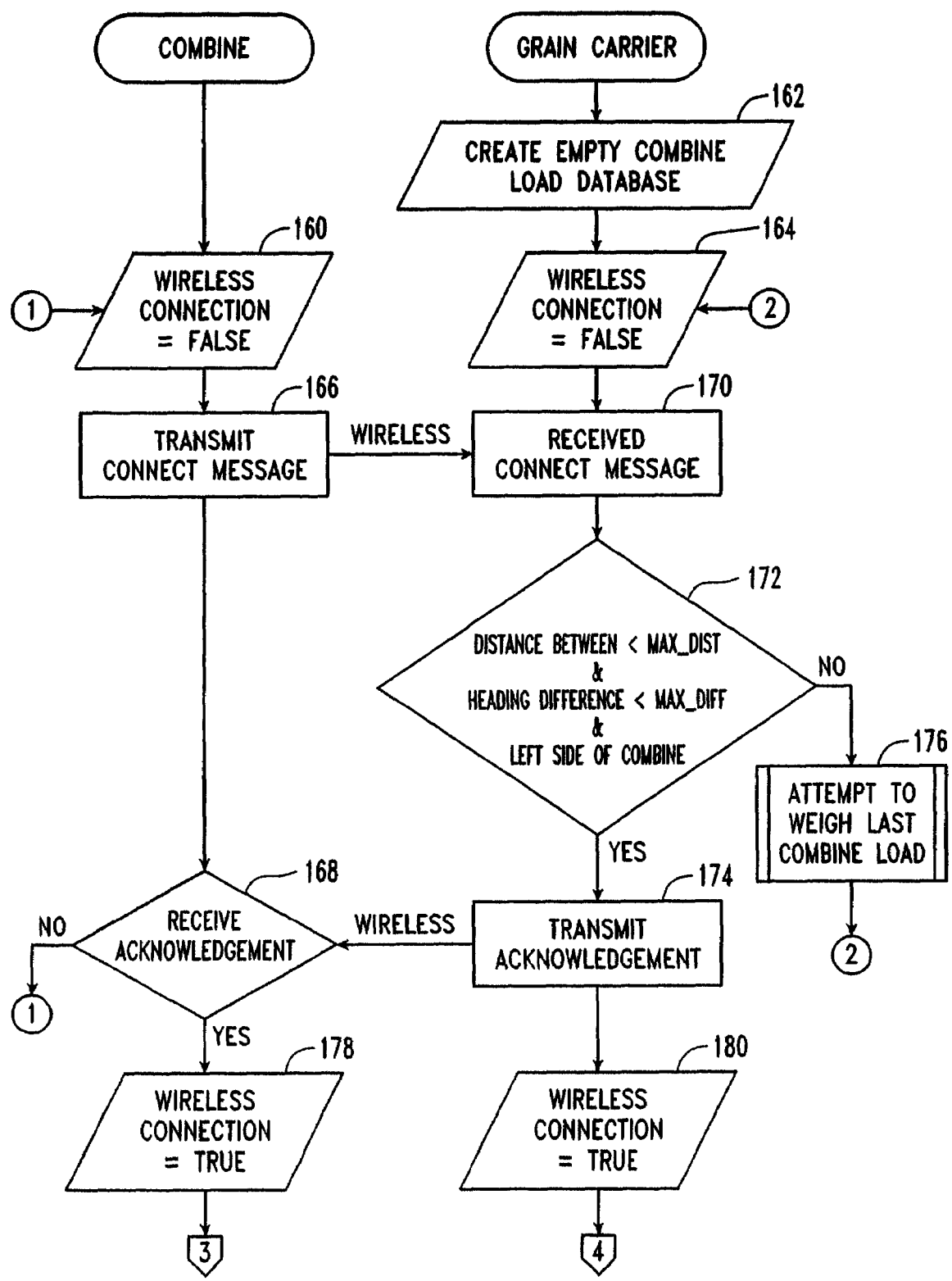
FIGS. 7-11 pertain primarily to the calibration of the combine.

FIG. 7 is a flowchart illustrating the establishment of a wireless connection between a combine and a grain carrier. At the combine, the process starts with step 160 where a wireless connection variable is set to FALSE. At the grain carrier, the process starts with step 162 where an empty combine load database is created. In addition, a wireless connection variable is set to FALSE at step 164. At step 166, the wireless transceiver of the combine transmits a CONNECT message. If, at step 168, it is determined that no message has been received from the grain carrier, the process loops back to step 160. This loop will continue until a reply message is received from the grain carrier.

At step 170, the grain carrier receives the CONNECT message from the wireless transceiver of the combine and the process proceeds to step 172. At step 172, the process asks whether the distance between the grain carrier and combine is less than a maximum desired distance (variable MAX_DIST), whether the heading difference is less than a maximum desired difference (variable MAX_DIFF), and if it is on the left side of the combine. If so, the process proceeds to step 174 where an acknowledgement signal is transmitted, and received (at step 168) by the combine. If not, then the process proceeds to step 176, where an attempt is made to weigh the last combine load. At this point, a wireless connection has been established between the combine in the grain carrier. At both the combine and grain carrier, a wireless connection variable is set to TRUE (steps 178 and 180).

Figure 8:
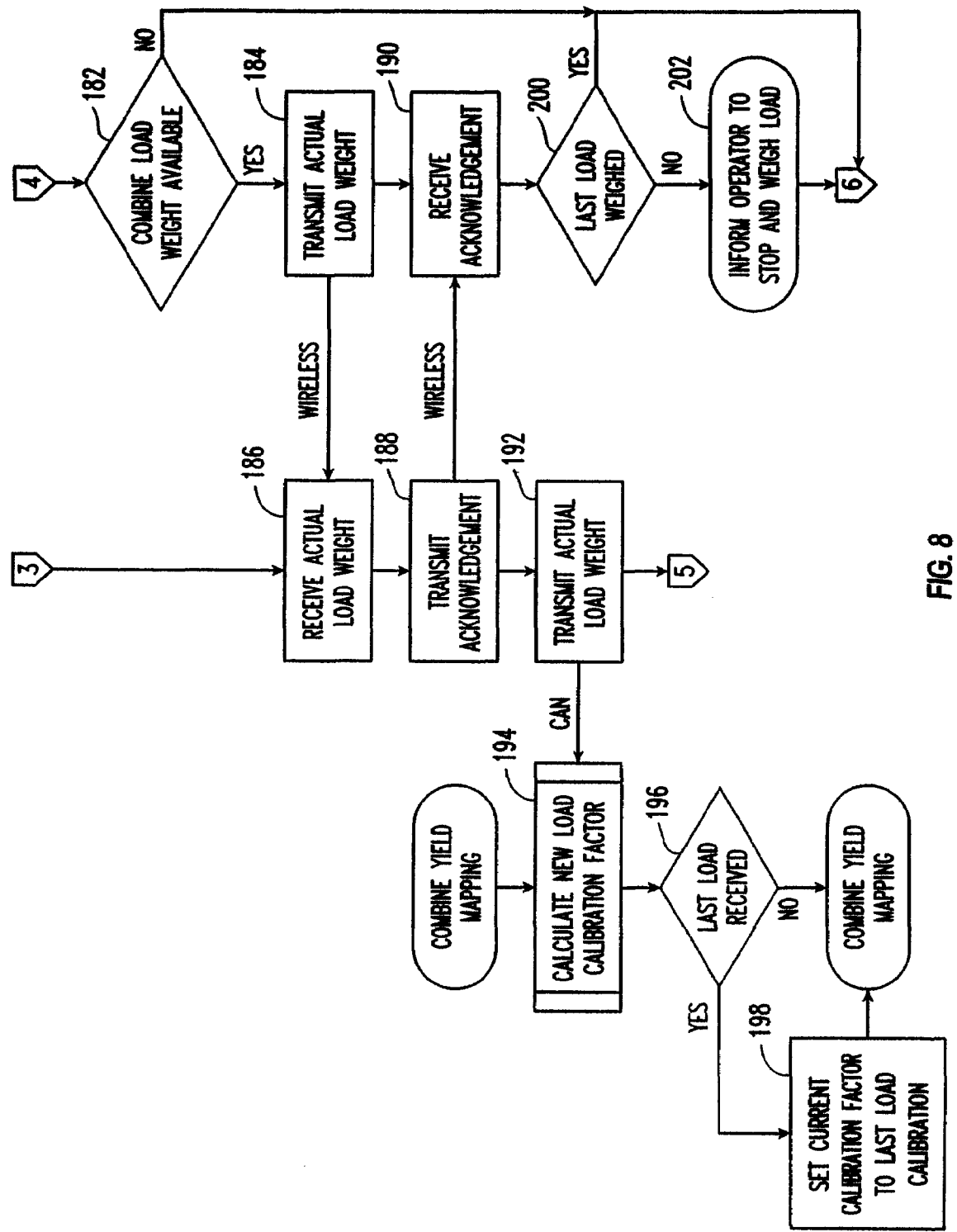
Figure 9:
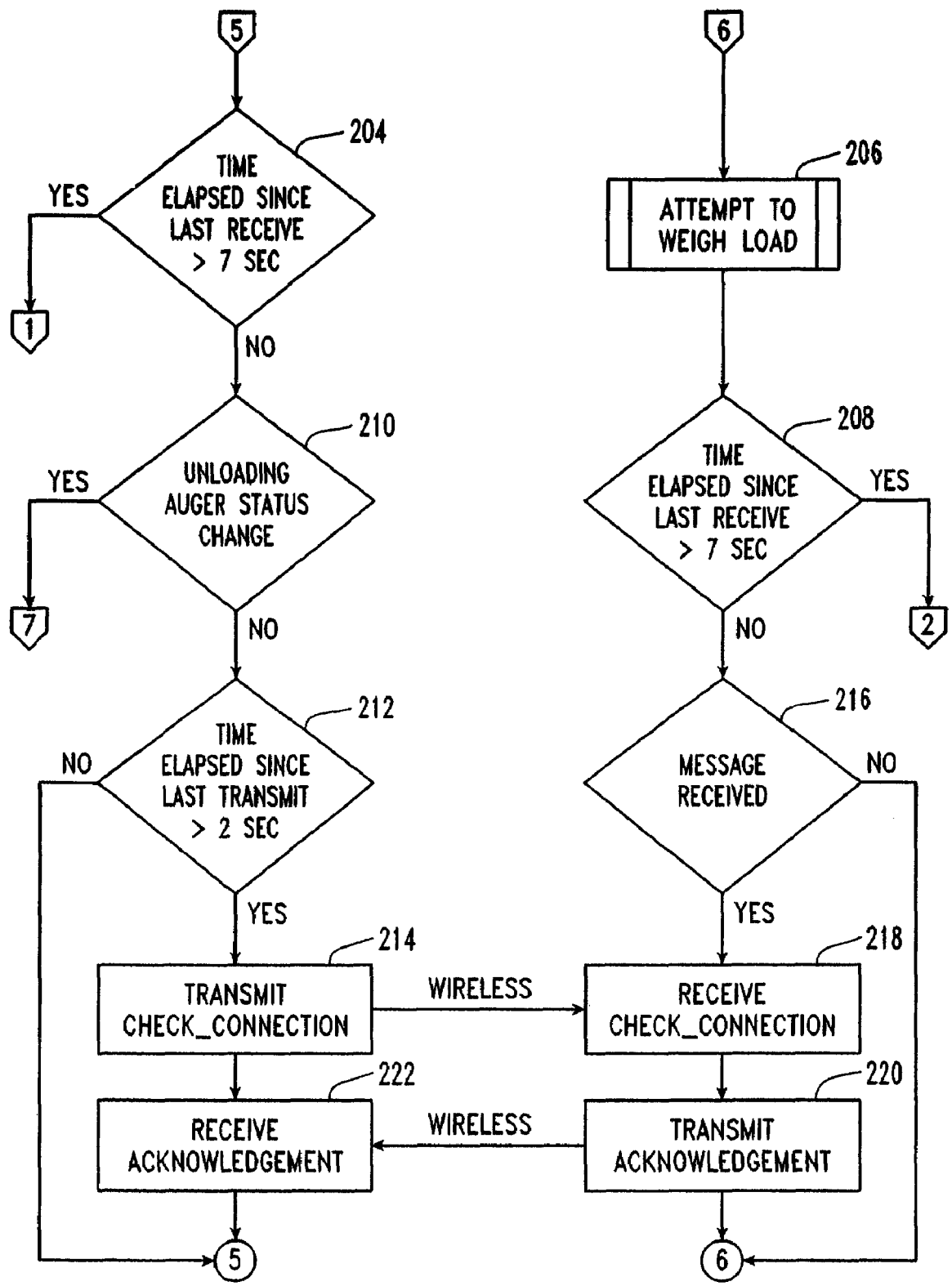

Once a wireless connection is established, a wireless connection start-up procedure is started. FIG. 8 is a flow chart of the wireless connection start-up procedure for the combine. At step 182, the process asks whether the combine load weight is available. If not, the process proceeds to step 206 (FIG. 9), described below. If the combine load weight is available, the process proceeds to step 184 where the actual load weight is transmitted to the combine. At step 186, the combine receives the actual load weight. In response, the combine transmits an acknowledgement signal at step 188. The grain carrier receives the acknowledgement at step 190. At the combine, the process proceeds to step 192 where the actual load weight is transmitted for use in a combine yield mapping process. At step 194, a routine is executed to calculate a new load calibration factor, based on the actual load weight. Next, at step 196, the process asks whether the last load was received. If so, the process proceeds to step 198 where the calibration factor is set to the last load calibration. At the grain carrier, the process proceeds to step 200 where the process asks whether the last load was weighed. If so, the process proceeds to step 206 (FIG. 9). If not, the process proceeds to step 202 where the system informs the operator to stop and weigh the load.

After the wireless connection start-up procedure described above has been completed, a process begins which maintains the connection. FIG. 9 is a flowchart of a procedure to maintain the connection. At step 204, the process asks whether the time elapsed since the last received signal is greater than a threshold value (e.g., 7 seconds). If so, it is determined that the connection has been lost and the process goes back to step 160 of FIG. 7. At step 206, the grain carrier attempts to weigh the load. Next, at step 208 the process asks whether the time elapsed since the last received signal is greater than a threshold value (e.g., 7 seconds). If so, it is determined that the connection has been lost and the process goes back to step 164 of FIG. 7. If a connection is maintained, the process at the combine goes through a loop until the connection is lost or the status of the unloading auger has changed. At step 210, the process asks whether the unloading auger status has changed. If so, the processors the process proceeds to step 224 in FIG. 10. If not, the process asks at step 212 whether the time elapsed since the last transmission is greater than a threshold value (e.g., 2 seconds). If not, the process proceeds back to step 204. If so, the process proceeds to step 214 and a CHECK_CONNECTION signal is transmitted. At the grain carrier, the process proceeds to step 216 and asks whether a message has been received. If not, the process goes back to step 206. If the CHECK_CONNECTION is received at step 218, an acknowledgment is transmitted at step 220 and received by the combine at step 222. The process at the grain carrier then proceeds back to step 206.

Figure 10:
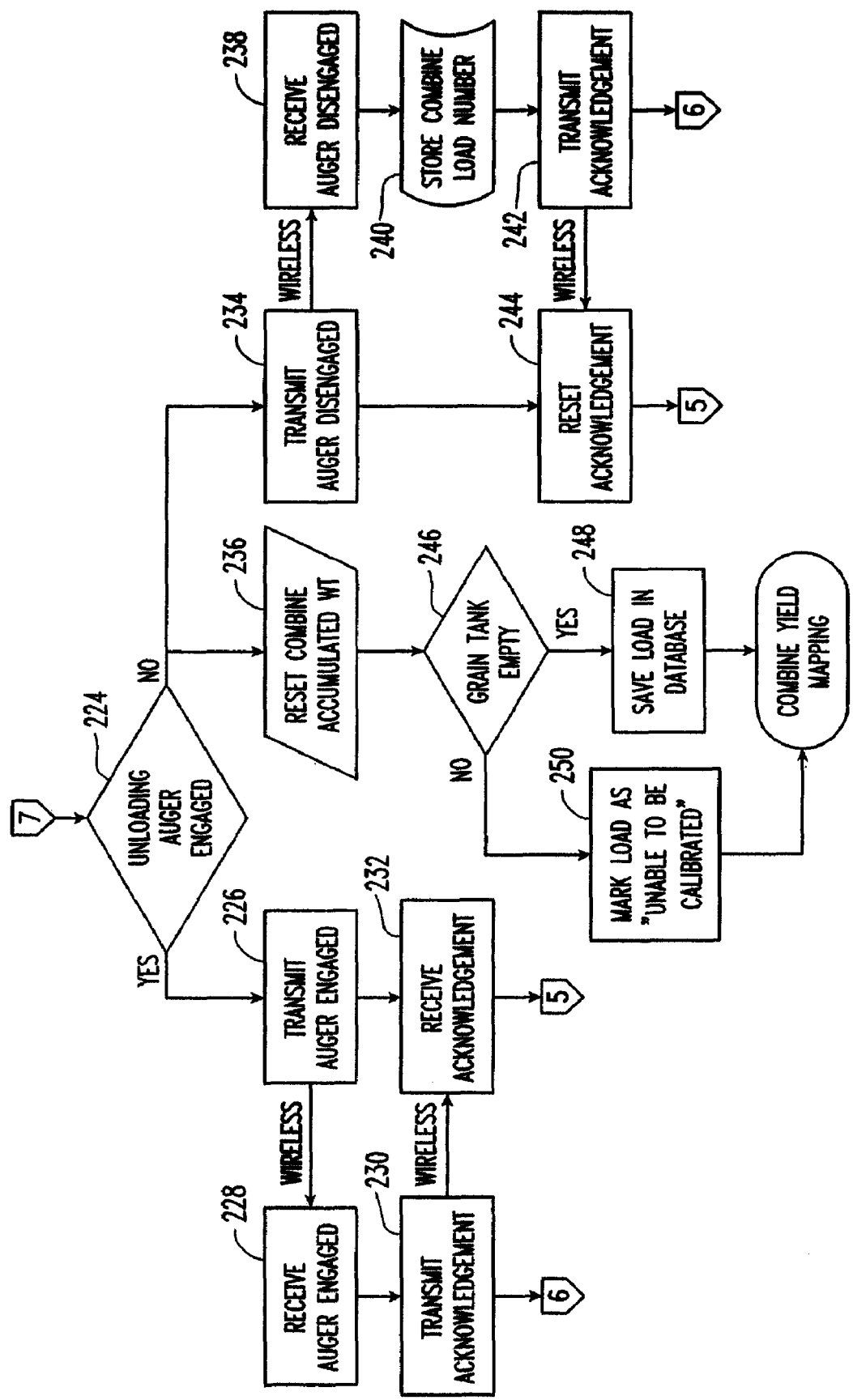

FIG. 10 is a flowchart of the combine unloading auger status change procedure. If, back at step 210, it was determined that the status of the unloading auger changed, the process illustrated in FIG. 10 is performed. The process illustrated in FIG. 10 begins with step 224 where the process asks whether the unloading auger is engaged. If the unloading auger is engaged (i.e., the combine has just begun unloading grain), the process proceeds to step 226 where the combine transmits an auger engaged signal. At step 228, the grain carrier receives the auger engaged signal and transmits an acknowledgment signal (step 230). At step 232, the combine receives the acknowledgment signal and the process proceeds back to steps 204 and 206 shown in FIG. 9. If, at step 224, the auger is not engaged (i.e., the combine has just finished unloading grain) the process proceeds to steps 234 and 236 where the combine transmits an auger disengaged signal and the combine accumulated weight variable is reset. At step 238, the grain carrier receives the auger disengaged signal, and stores the combine load number at step 240. At step 242 the grain carrier transmits an acknowledgment signal, which is received by the combine at step 244. Next, the process proceeds to steps 204 and 206 of FIG. 9, where an attempt is made to weigh the load. At step 246, the process asks whether the gain cart is empty. If so, the process proceeds to step 248 where the load is saved in the database. If not, the process proceeds to step 250 where the load is marked as "Unable to be Calibrated". The process then proceeds to the combine yield mapping routine.

Figure 11:
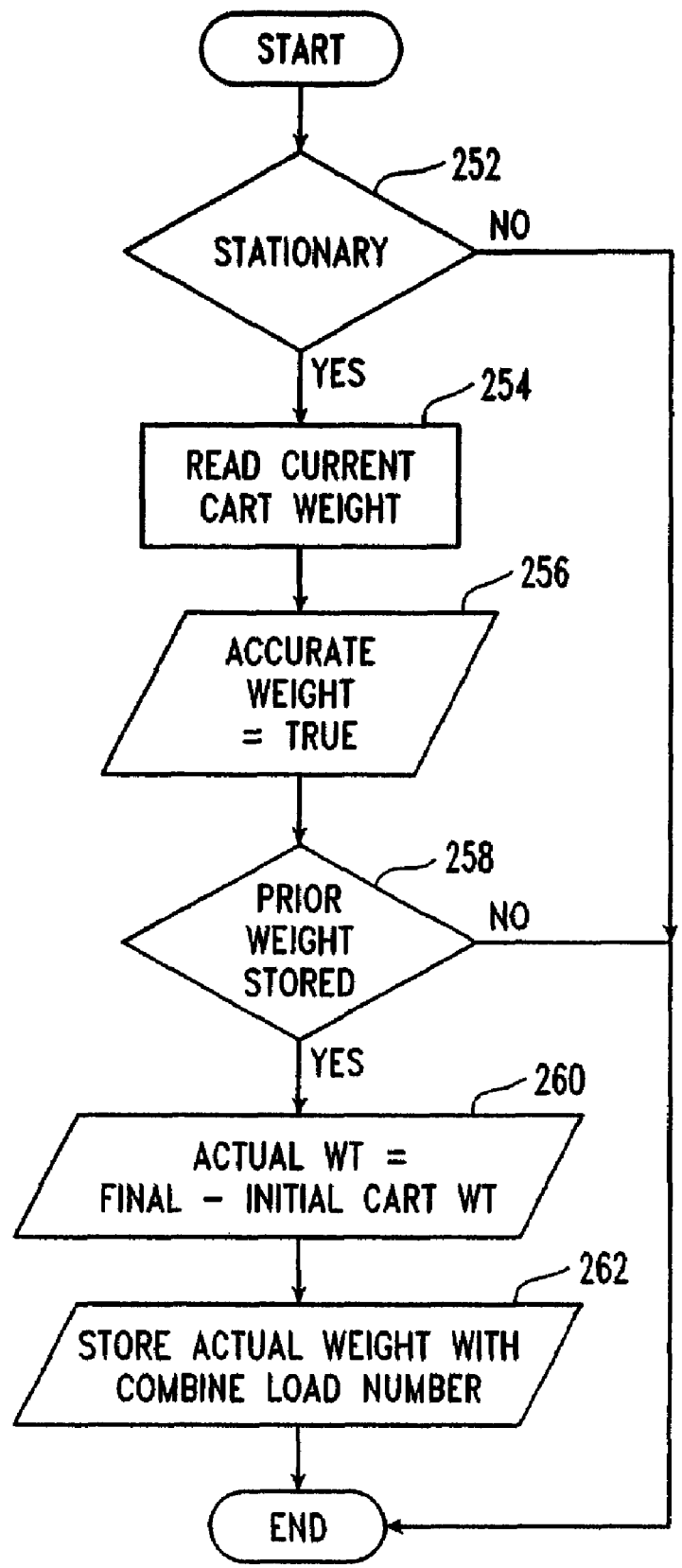

FIG. 11 is a flowchart illustrating the process of weighing the last load on the combine. The process begins at step 252 where the process asks whether the grain carrier is stationary. If not, the process ends. If the grain carrier is stationary, the process proceeds to step 254 where the current cart weight is read. Next, at step 256, the accurate weight variable is set to TRUE. At step 258, the process asks whether a prior weight is stored. If not, the process ends. If a prior weight is stored, the process proceeds to step 260 where the actual weight variable is set equal to the final weight minus the initial weight (i.e., the actual weight of the grain is calculated since the measured weights include the weight of the grain carrier). At step 262, the actual weight with the combine load number is stored and the process ends.

While the present invention was described in the context of a mass-flow sensor on a combine, the invention could also be used in other ways. For example, the invention could be used to calibrate other sensors such as a moisture sensor. In addition, the calibration information could come from other sources. For example, an elevator could send calibration information to combines after weighing grain that is brought to the elevator. Other embodiments and alternatives are also possible.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A system for calibrating a mass-flow sensor of a combine, the system comprising:
   a yield monitor associated with the mass flow sensor;
   a first wireless transceiver operatively connected to the yield monitor;
   a second wireless transceiver on a grain carrier for transmitting calibration information relating to the actual weight to the first wireless transceiver, the second wireless transceiver arranged for transmitting an acknowledgement signal to the first wireless transceiver regarding a distance between the grain carrier and the combine and a heading difference between the grain carrier and the combine, wherein the mass-flow sensor is calibrated for a load of the combine if the distance is less than a maximum desired distance and if the heading difference between the grain carrier and the combine is less than a maximum desired difference.

2. The system of claim 1, wherein grain harvested by the combine is transferred to the grain carrier.

3. The system of claim 2, wherein the calibration information includes information relating to the weight of the grain in the grain carrier.

4. The system of claim 1 wherein the grain carrier further comprises:
   a calibration processor for generating calibration information for transmission from the second wireless transceiver to the first wireless transceiver for calibrating the mass-flow sensor.

5. The system of claim 1 wherein the load of the combine is calibrated as a last load if the distance is greater than the maximum desired distance.

6. The system of claim 5 wherein the calibration of the last load is accomplished in accordance with the following equation: NewCalib=OldCalib *(Estimated Weight/Actual Weight); wherein NewCalib means a new calibration of the mass-flow sensor, OldCalib means an old or previous calibration of the mass-flow sensor, Estimated Weight means an estimated weight of the load, and Actual Weight means an actual weight of the load.

7. The system of claim 1 wherein the load is calibrated as a current load if the distance is less than the maximum desired distance, if the heading difference is less than a maximum desired heading difference and if a relative position between the grain carrier and the combine is on a load transferring side of the combine.

8. The system according to claim 1 further comprising:
   a weighing system, associated with the grain carrier, for determining an actual weight of a grain carrier load of an agricultural product carried by the grain carrier.

9. A system for calibrating the mass flow sensor on a combine comprising:
   a yield monitor coupled to a mass flow sensor on the combine;
   a first wireless communications device on the combine and capable of communication with the yield monitor that calibrates the mass flow sensor;
   a second wireless communications device capable of communication with the first wireless communications device on the combine, the second wireless communications device adapted to transmit information relating to an actual weight of the harvested grain for calibration of the mass flow sensor if a distance between the combine and the vehicle is less than a maximum desired distance and if a heading difference between the vehicle and the combine is less than a maximum desired difference.

10. The system of claim 9 wherein the second communications device comprises a remote wireless communications device on a grain carrier as the vehicle.

11. The system of claim 9 wherein the second communications device comprises a remote wireless communications device on a truck as the vehicle.

12. The system according to claim 9 further comprising:
 a weighing system, associated with a vehicle, for determining an actual weight of a vehicle load of an agricultural product carried by the vehicle.

* * * * *